United States Patent [19]

Rademacher

[11] Patent Number: 4,791,510

[45] Date of Patent: Dec. 13, 1988

[54] MAGNETIC TAPE TRANSDUCER APPARATUS FOR USE WITH MULTI-SIZE CASSETTES

[75] Inventor: Karl-Heinz Rademacher, Alsbach, Fed. Rep. of Germany

[73] Assignee: Robert Bosch GmbH, Stuttgart, Fed. Rep. of Germany

[21] Appl. No.: 79,819

[22] Filed: Jul. 30, 1987

[30] Foreign Application Priority Data

Aug. 8, 1986 [DE] Fed. Rep. of Germany ....... 3626941

[51] Int. Cl.⁴ .............................................. G11B 15/00
[52] U.S. Cl. ................................................... 360/94
[58] Field of Search ............... 360/94, 137, 96.6, 96.1, 360/96.5, 90, 91, 92, 93, 97, 98, 99; 369/75.1, 77.1, 77.2

[56] References Cited

U.S. PATENT DOCUMENTS

| 4,012,790 | 3/1977 | Lemeloon ............................ 360/94 |
| 4,181,823 | 1/1980 | DeLamoreaux et al. ........... 260/137 |

FOREIGN PATENT DOCUMENTS

| 0140211 | 5/1985 | European Pat. Off. ........... 360/96.6 |
| 0108003 | 6/1983 | Japan ................................. 360/96.5 |
| 0055547 | 3/1985 | Japan ................................. 369/75.1 |

Primary Examiner—Robert S. Tupper
Assistant Examiner—Andrew L. Sniezek
Attorney, Agent, or Firm—Frishauf, Holtz, Goodman & Woodward

[57] ABSTRACT

To permit only centered insertion of variously sized cassettes (SML) of a set of cassettes into an opening leading into an insertion well of a tape transducer housing (H), cover flaps (1,3,7) are located across the opening, the cover flaps being positioned symmetrically with respect to a central axis of symmetry (XX) of the insertion path. One of the flaps, corresponding in size to the smallest one of the cassettes, closes off the path for the smallest cassette. The next flap is subdivided into two flap portions located, symetrically, adjacent the center flap, and cross-connected by a cross-connecting shaft or strap (3c,63c). Adjacent thereto are outer flap portions (7a,7b). The respective flap portions are locked in position by releasable locks (4) engageable by the leading edge of the respective cassettes. The locks are located adjacent the outer edges of the respective flap portions. Only if both appropriately sized flap portions are released from the locks, can the openings be completely uncovered. Depressible guide ridges can be formed in the cassette well to guide the respective cassettes.

10 Claims, 6 Drawing Sheets

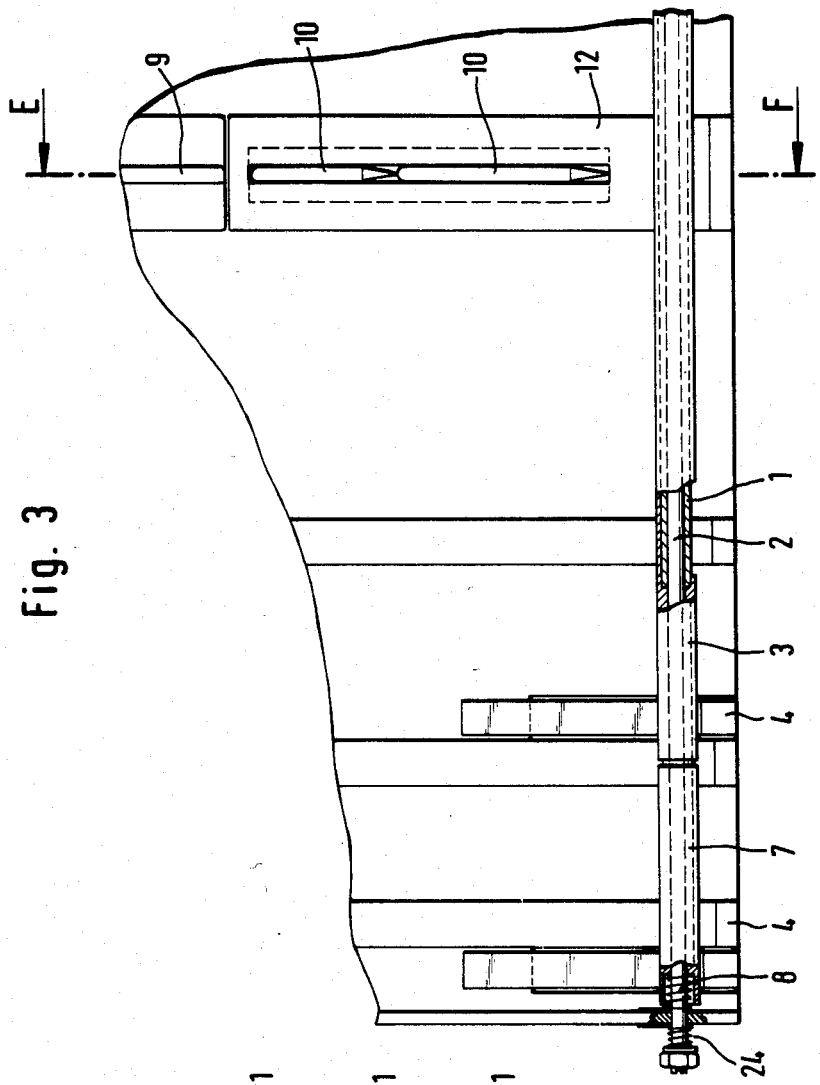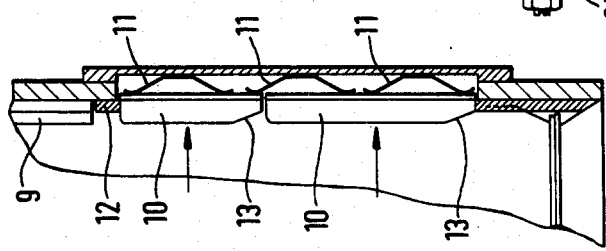

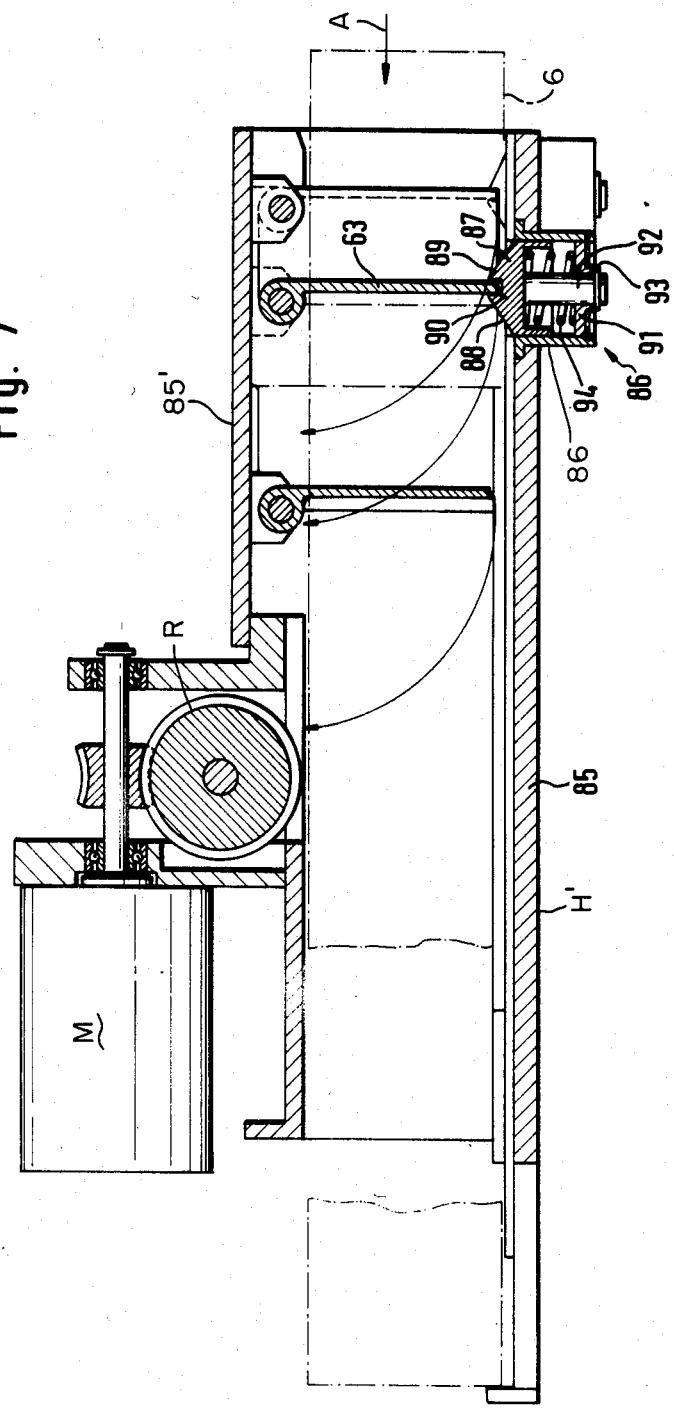

MAGNETIC TAPE TRANSDUCER APPARATUS FOR USE WITH MULTI-SIZE CASSETTES

Reference to related patent, the disclosure of which is hereby incorporated by reference:
U.S. Pat. No. 4,379,313, Tsuchiya; U.S. Pat. No. 4,636,887, Kato et al.
Reference to related publication:
European patent application publication No. 0 133 822, Shiratori.
Reference to related applications, assigned to the assignee of the present application, the disclosure of which is hereby incorporated by reference:
U.S. Ser. No. 079,829, filed July 30, 1987, Rademacher.
U.S. Ser. No. 079,820, filed July 30, 1987, Rademacher and Wolf.
U.S. Ser. No. 079,832, filed July 30, 1987, Rademacher.

The present invention relates to magnetic tape apparatus and more particularly to cartridge or cassette loaded tape apparatus in which a tape is introduced into a housing portion of the apparatus, which housing portion retains transducer heads, tape pulling apparatus and the like.

BACKGROUND

Tape transducing apparatus, and more particularly magnetic tape apparatus suitable for recording or reproduction of digitally coded television signals preferably used tape wound on winding reels located in cassettes. Different lengths of programs can be stored on reels, and in sets having different dimensions. The widths dimension of the tape is standardized, and thus the thickness of the cassette will be the same even though the length of the tape wound on reels may differ. Long tapes require large reels; shorter tapes can be wound on smaller reels. Thus, cassettes of different dimensions can be used and it has been proposed to provide three standard cassette sizes, small (S), medium (M) and large (L). In one proposal, the plan dimensions of the cassettes would be for the S-cassette, about 172×109 mm, for the M-cassette, 254×150 mm, and for the L-cassette, 360×206 mm. All three types of cassettes are formed with guide grooves at the bottom side of the cassette housing. The guide grooves have similar cross-sectional dimension, but are of different lengths.

A cassette transducing system should be capable of accepting any of the differently dimensioned cassettes of the set of cassettes. Loading should be simple and, preferably automatic, by a cassette loading transport system which pulls the respective cassettes into the well of the housing provided for the reception of the cassette and retaining the transducing apparatus. The widths of the cassette well will, of course, be of sufficient size to accept the largest one of the cassettes of the set. When the user wishes to insert the largest one of the cassettes, it can readily be fitted into the cassette reception opening and properly place the cassette in the cassette receiving well. If, however, a smaller cassette, for example a M-, or S-cassette is to be inserted, the user must be guided regarding proper positioning so that the cassette will be introduced centrally within the opening, that is, along a longitudinal line of symmetry—with respect to the insertion opening—so that the tape will be properly positioned with respect to tape handling and/or transducing apparatus within the housing. The user, thus, must be guided for proper placement, which can be located with some practice. The guide groove for all three types of cassettes is enlarged at the entrance in order to facilitate the centering of the cassette. Frequently, however, and particularly if change of cassette has to be carried out rapidly, under time pressure, in the dark, or otherwise without being able to pay close attention to proper insertion, misalignment of the cassette with the transducing apparatus may occur.

The cassettes may be used in studio application and/or combination with editing or reproduction of news reports, so that leisurely and careful insertion of cassettes into the transducer apparatus is not always possible.

U.S. Pat. No. 4,329,313 describes a tape cassette loading apparatus which, however, is suitable only for a single size of cassettes. Published European application EP No. 0 133 822 describes a drive arrangement for magnetic tape cassettes in which the spacing of the axes of rotation of the respective tape reels differs, so that magnetic tape cassettes of different sizes can be handled by the apparatus. This apparatus, however, requires careful placement of the respective cassettes so that they will be located in centered position, and no provision has been made to facilitate or guide the insertion of cassettes which are smaller than the largest cassette opening in precisely centered appropriate position.

THE INVENTION

It is an object to provide a tape transducing apparatus suitable with any one of differently dimensioned cassettes of a set of tape cassettes in which insertion of the different types of cassettes will be simple with automatically reliably centered placement of the cassettes in the apparatus.

Briefly, the cassette well opening is closed by a cover flap which is subdivided into at least two flap portions. Each one of the portions is positioned symmetrically with respect to a central axis of symmetry along which the cassette is to be inserted. Some flap portions are coupled together to permit only conjoint movement of the flap portions. Individual locking means lock the flap portions, individually, in closed position across the well opening, and inhibit introduction of a cassette through the opening in the housing. The locking means, for example a spring-pressed element, can be engaged by the leading edge of the cassette as it is intended to be introduced in the housing to thereby unlock the locking arrangement, and thus unlock the flap portions. If an attempt is made to introduce a cassette off-center, or in unsymmetrical position with respect to the axis of symmetry, one of the locking means will not be engaged by the leading edge of the cassette, and thus hold the respective flap portion closed. Since this flap portion is, however, cross-coupled to the other flap portion at the other side, it, likewise, will remain closed and thus prevent opening movement of the other flap portion as well. Unsymmetrical, or off-center introduction of a cassette into the opening, thus, is reliably inhibited.

The arrangement has the advantage that off-center position of a cassette of smaller dimension than that of the largest one is effectively impossible. Further, the use of such an apparatus substantially facilitates introduction of cassettes since cassettes can be introduced even under conditions of poor illumination, time pressure or the like; if a cassette is not perfectly centered, it cannot be introduced and merely by sliding it sideways, the centered position is readily found.

It is a specific advantage for the user that no arrangement or selection steps need be carried out to place a respective cassette in properly aligned location within the cassette shaft or well. Regardless of the size of the cassette, placement will always be symmetrical. Additionally, the system is simple and reliable, and can be adapted to existing cassette structures.

DRAWINGS

FIG. 3 is a fragmentary top view of FIG. 1, partially sectioned along line C–D of FIG. 2;

FIG. 4 is a fragmentary sectional view along line E–F of FIG. 3;

FIG. 7 is a fragmentary detailed view of the arrangement of the embodiment of FIG. 5, illustrated in partial longitudinal section and to an enlarged scale.

DETAILED DESCRIPTION

Figure 1:
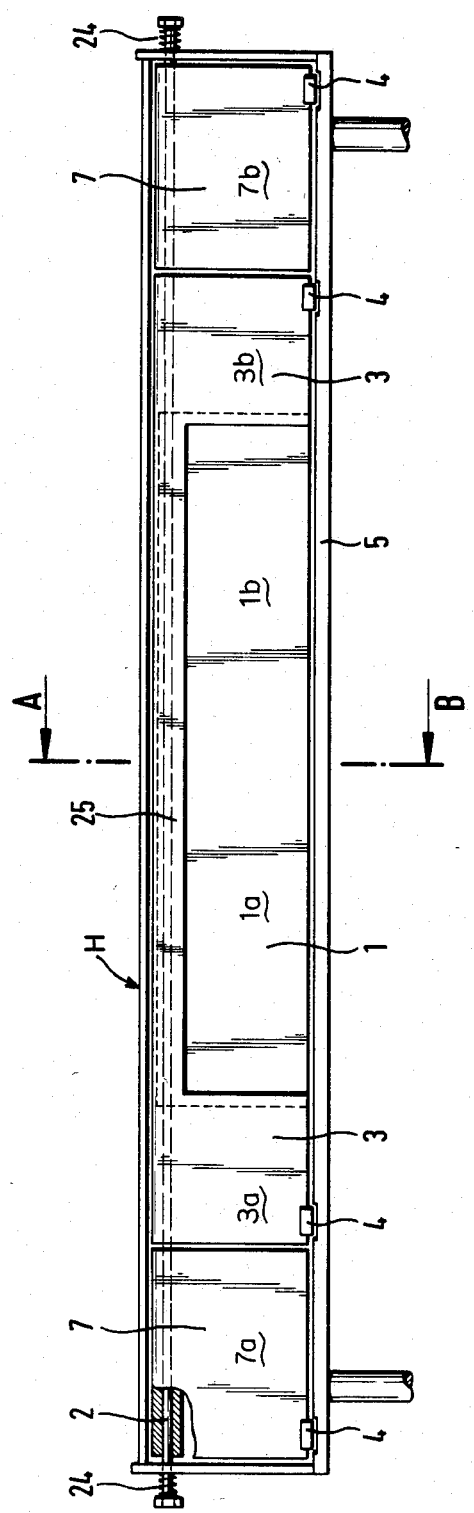
FIG. 1 is a front view of a first embodiment of the invention.

The cassette well for introducing cassettes into a housing structure H (FIG. 1) is closed off by three cover flaps 1,3,7. The three cover flaps are rotatable about an axis of rotation of a shaft 2. The shaft 2 is retained above the clear opening of the housing H, that is, above a cassette insertion well thereof. The center flap 1, formed integrally of two flap portions 1a,1b and positioned symmetrically with respect to a central plane of symmetry X—X, is secured to the shaft 2, so that, upon rotation of the flap 1, that is, of both of its integral unitary portions 1a,1b, the shaft 2 will rotate therewith. The dimension of the flap 1 is just slightly greater than the widths dimension of the smallest or S-cassette. One or two springs 24 bias the shaft 2 so that the flap 1 will close off the opening of the cassette well. The flap 1 engages, at both sides, against two flap portions 3a,3b of a flap 3. Flap 1 engages behind the flap portions 3a,3b. They are positioned on the shaft 2, but coupled together by a coupling rod 25 or the like and positioned above the clear opening of the cassette. Both flap portions 3 are retained in closed position by a locking arrangement 4, against which the edge portions of the flaps 3a,3b may engage. The outer limits of the flap portions 3 cover that cross-sectional surface which corresponds, with slight clearance, to the widths dimension of a M-cassette.

Two further flap portions 7a,7b cover the final opening parts of the cassette well. These flap portions, likewise, are loosely retained on the shaft 2, and are held in closed position by an interengaging lock arrangement 4. They, may, but need not be connected together by a cross-connecting bar or rod.

Figure 2:
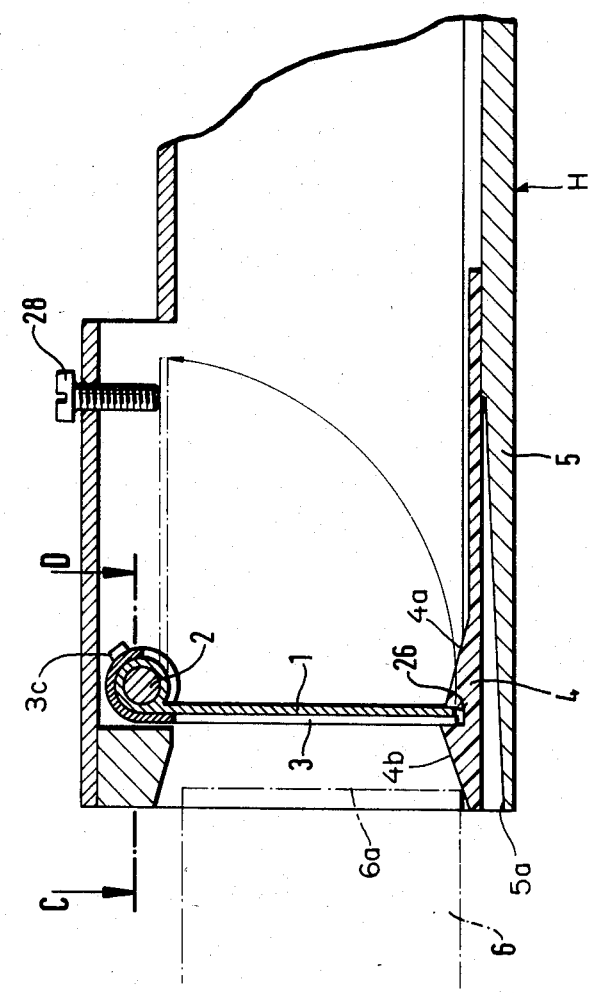
FIG. 2 is a cross-section along line A–B of FIG. 1, to an enlarged scale.

The holding arrangement for the respective flaps is best seen with reference to FIG. 2. The bottom wall 5 of the housing H carries a spring element 4a which has an inclined front and rear edge portion. The spring element can be resiliently depressed downwardly, into a reception groove 5a formed in the housing H therebeneath. When a cassette 6 is intended to be introduced into the housing, the leading edge 6a of the cassette will engage the inclined surface 4b of the spring 4a and depress the spring. This causes a transverse groove 26, within which an edge portion of the respective flap portions 3a,3b or 7a,7b are retained to be released, so that the flap 3, or, rather, the respective portions 3a,3b will be freed. In FIG. 2, outer flaps 7a,7b have been omitted for clarity of the drawing. The interlocks 4 for the flaps 7a,7b are identical to those described in connection with FIG. 2. Limiting screws 28, screwed through the top plate of the housing, are provided to limit the deflection of the respective flaps. Instead of the coupling rod 257 the cross-connecting rod or strap 3c, connecting the flap portions 3a,3b together, can be placed at any suitable location, for example as shown on a holding loop formed by the respective flaps about the shaft. The thicknesses of the flaps have been shown exaggerated, for clarity of the drawing; in actual practice, the flaps can be thin plastic or sheet metal elements.

When a cassette is pulled out from the cassette well, first flap 1, then 3 and/or 7 are released, so that they can fall downwardly, either by their own weight, or under the influence of the springs 24. Upon complete withdrawal of the cassette 6, spring snap locks 7 are released, for reliably holding the respective flap portions in the position shown in FIG. 2.

The effect of centering the respective differently dimensioned cassettes of the set of cassettes is obtained by subdividing the flaps 3 and 7 into the flip portions 3a,3b, 7a,7b, in combination with the respective locking arrangements 4. For example, if it is attempted to insert a small S-cassette off-center or beyond the axis of symmetry X—X, through the opening closed by the flap 1, one of the locks 4 of one of the flap portions 3a or 3b, for example, may be unlocked. Since the two flaps, however, are connected together by the strap 3c, the flap portion 3, the lock of which has been released, will not open since the other flap portion will remain locked. The other flap portion, in the example selected flap portion 3b, would not be engaged by the smaller cassette S and thus retain all the flap portions in their closed or rest position. Lateral shifting of the cassette, however, will readily find the position at which the center flap 1 will open.

Likewise, if it is attempted to insert a M-cassette off-center, one, for example the flap 7b, may be unlocked, but a cross-connection similar to the cross-connection 3c of the flaps 7a,7b will hold both flaps locked since the M-cassette is insufficiently wide to also unlock the interlock 4 for the flap portion 7a. Even a small offset from centered position will not open the corresponding flap on the other side. The arrangement reliably prevents attempted introduction with small offsets of, for example, 15 mm and less. Flap portion 3a also will lock If all the cassettes of a set are placed into the housing in centered position, the smallest flap, that is flap 1 for the S-cassette, will be lifted and provides an entrance opening corresponding to the respective cassette, so that the cassette can be placed into the cassette well. Once the cassette has been introduced into the cassette well, a longitudinal guide arrangement, to be described below, will guide the cassette longitudinally into the cassette well.

Centered insertion of a M-cassette releases the locks 4 which hold in position the flaps 3a,3b to permit ready insertion of the cassette into the cassette well.

Insertion of a cassette of the largest size, that is, a L-cassette, in offset position is impossible, since the cross-sectional dimensions of the cassette and the cross-sectional dimensions of the housing structure—with some clearance—are matched. The respective locks of the flaps 3 and 7 are released by the leading edge 6a of the respective cassette. The bottom walls of all the cassettes are formed with a guide groove which guides the cassettes into the cassette well and which facilitates the insertion and introduction movement of the cassette. To provide for appropriate cooperation between the cassette and magnetic transducing apparatus in the cassette well, it is desirable to guide all cassettes of the set, reliably, from the beginning of the insertion movement towards the end of the tape placement within the apparatus, by reliably guiding the respective cassettes by means of the guide grooves. The bottom wall 5 of the housing H, is thus formed with guide arrangements which must be present over a length sufficient to accomodate the length of the guide groove in the longest, that is, the L-cassette. All guide grooves are closed at the end, and it is thus necessary that the guide arrangements can be utilized initially, however become ineffective towards the end of the insertion movement, so that they can be overridden at the end portion.

FIGS. 3 and 4 illustrate the longitudinal guiding of the cassettes; details with respect to the insertion flaps have been omitted from these drawings for clarity.

The guide arrangement is subdivided in a fixed portion 9 and to movable elements 10, both located at the bottom wall 5 of the housing H. The fixed portion 9 of the guide arrangement is equally effective and acting for all three cassette sizes, and has a length which corresponds to the length of the smallest one of the cassettes, that is, the S-cassette. The two movable parts 10 of the guide arrangement are so matched in their length that, together with the fixed part 9, they provide guidance for all sizes of the cassettes. However, upon insertion of the medium size and smallest cassettes, they can be lowered to the level 12 of the bottom wall 5 of the cassette well. As best seen in FIG. 4, the elements 10—illustrated vertically for ease of drawing convenience—are resiliently retained on leaf springs 11. They are formed with inclined wedge surfaces 13, facing the leading edge of the cassette 6. They can be lowered into the level of the bottom wall by the closing wall of the guide groove in the cassette, counter the spring force of the leaf springs 12.

Figure 5:
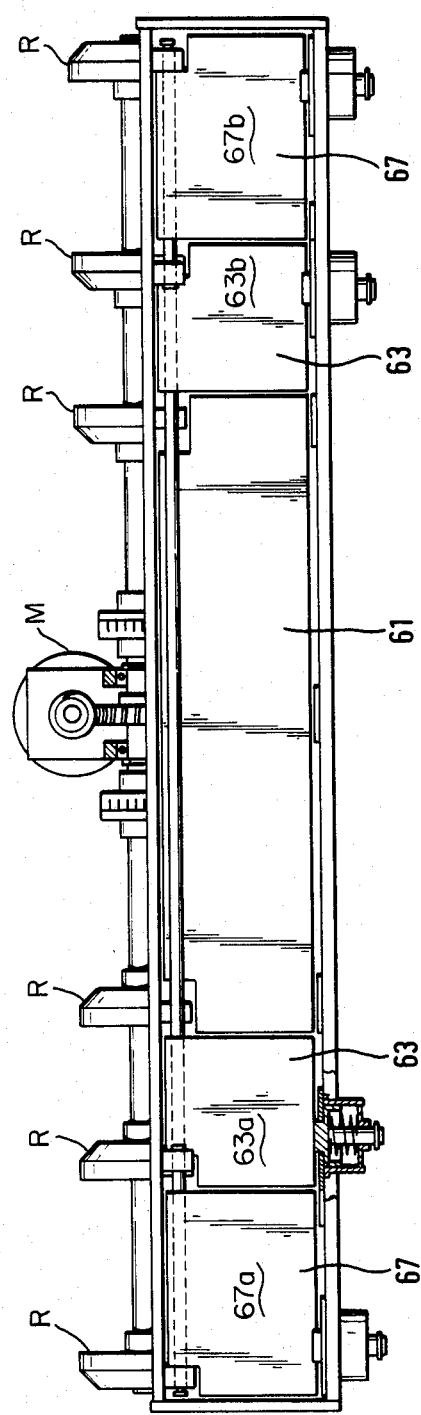
FIG. 5 is a front view similar to FIG. 1 and illustrating another embodiment.
Figure 6:
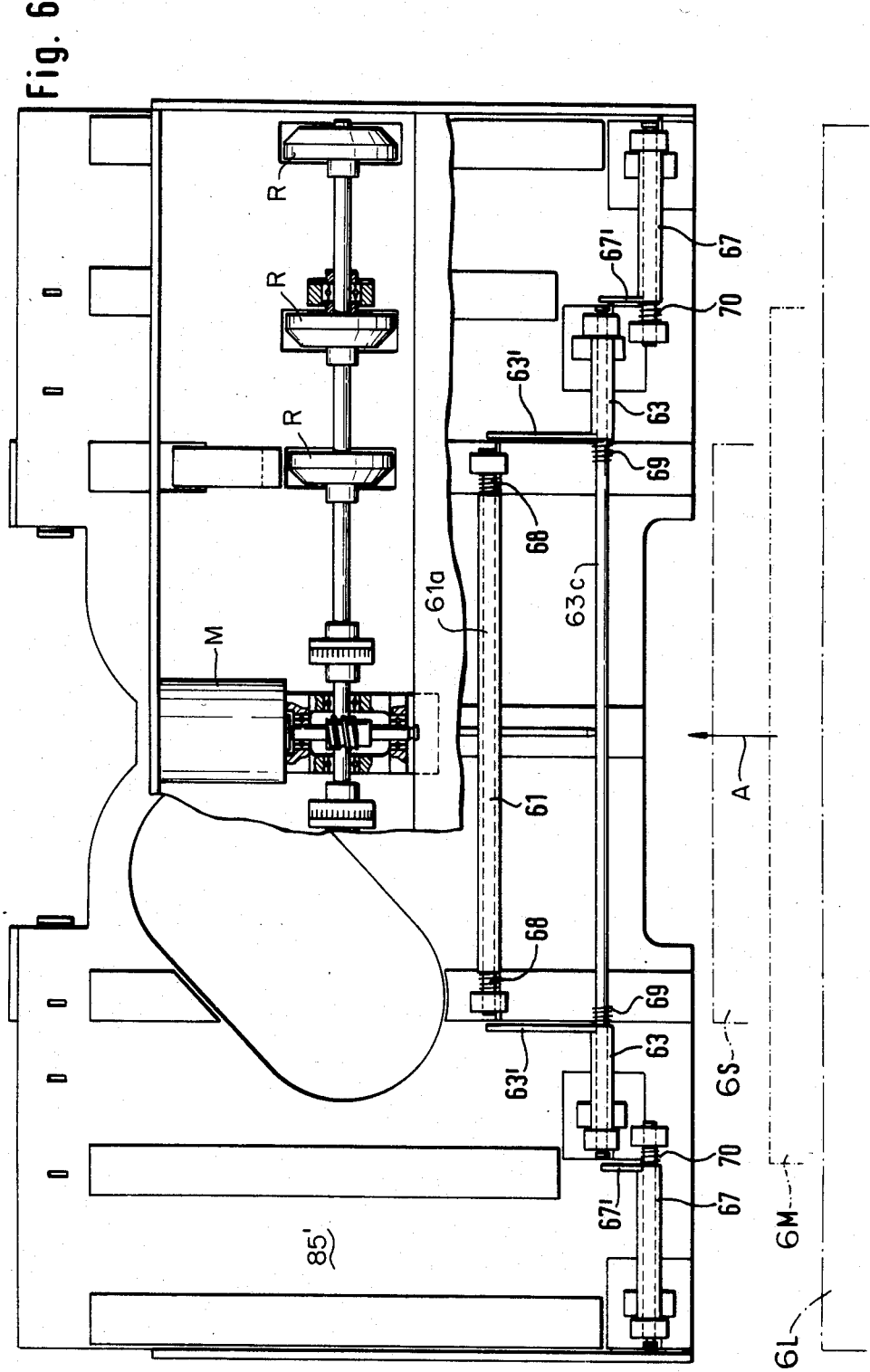
FIG. 6 is a top plan view of the embodiment of FIG. 5.

FIGS. 5 to 7 illustrate another embodiment of the invention which differs from the previously described embodiment primarily in that the respective flaps, closing off the cassette well in sections or subdivisions, are staggered longitudinally along the length of the cassette well, and are supported on individual rotatable shafts, to which they can be secured to rotate therewith. This arrangement permits better matching of the respective flap elements since closing forces by spiral springs can be individually adjusted or individually matched to the conditions in which the flaps must operate. Additionally, the locking mechanism which holds the respective flap portions in locked condition can be changed, and the embodiments of FIGS. 5 to 7 illustrate a modified locking mechanism which, however, can be equally used in the embodiment of FIGS. 1 and 2. Likewise, the locking arrangement illustrated in connection with FIGS. 1 and 2 can be used in the embodiment of FIGS. 5 to 7.

The flap elements illustrated in FIG. 5, 61, 63, 67 are so arranged that a unitary central flap 61 is provided, and two flaps with portions 63a,63b and 67a,67b. As in the embodiment of FIG. 1, the flaps are located symmetrically with respect to a central symmetrical plane of symmetry X—X. The central flap 61 corresponds, in cross-sectional dimension, to the outer dimension of the smallest S-cassette, with some clearance; the flap 63, together with the flap 61, corresponds to the cross-section of the medium M-cassette and the flaps 67, together with flaps 63 and 61 correspond, in overall dimension, to the largest or L-cassette. Respective cassettes S-, M- and L- are shown in broken lines 6S, 6M, 6L in FIG. 6, which also illustrates the direction of insertion by arrow A. FIG. 6 clearly shows that the respective axes of rotation of the flaps 61,63,67 are staggered along the direction of insertion opening. To prevent entry of dust or other contaminants in to the cassette well, flaps 63 and 67 are formed with lateral flap extensions 63',67' at the respective sides facing the adjacent flaps. These lateral flap portions require an opening at the upper wall 85' of the cassette well. Longitudinally staggering the respective flaps substantially simplifies the loading of the cassette well with the respective cassettes 6.

FIG. 6 also shows an automatic pull-in arrangement including pull-in rollers R which are motor-driven by a motor M. This arrangement is illustrated, described and claimed by the copending application Ser. No. 079,829, filed July 30, 1987, by the inventor hereof.

The modified locking arrangement is best seen in FIG. 7, where a section line shows the locking arrangement only for the flap 63. The bottom wall 85 of the housing H' has a cup 86 fitted therein which defines a chamber. The cup, preferably, has circular cross-section and retains the locking slider 87, spring-pressed by a spring 91 towards an upper stop, for example formed by a portion of a guide ridge or the like. The slider 87, forming the actual lock arrangement or locking plug, has two inclined ramps 88,89. At the apex of the ramps, a groove 90 is formed to receive the lower edge of the flap 63. The plug or slider 87 is centrally guided by a cylindrical pin 92, passing through the bottom wall of the cup 86. A C-ring 93, fitted around pin 91 can also be used to retain the pin 92—slider 87 combination in position.

The inclined surfaces 88,89 are similar to ramps, and they extend over the level of the bottom surface 85 of the housing H. Upon introduction of a cassette, the leading of the cassette will press the ramps downwardly, counter the force of spring 94, thereby depressing the slider 87 and releasing the respective flap—in the illustration flap 63, so that the flap can then be lifted in clockwise direction, as schematically shown by the curved arrows in FIG. 7.

The locking functions of the flaps 61,63,67, and the centering effect thereof, are the same as those described in connection with the embodiment of FIG. 1, and need not be described again. Since, however, the flap portions 63a,63b are coupled together by shaft 63c, attempted introduction of a S-cassette, for example off-center and in alignment with the flap 63a, will not unlock the lock associated with the flap 63b. Attempted off-centered introduction of a S-cassette in a position where no lock of flap 63a,63b,67a,67b is unlocked, of course, also will prevent introduction of the cassette. The flap 69a,69b need not be connected together by a cross-coupling shaft since, if it is attempted to introduce either a S- or M-cassette with sufficient offset to unlock one of the flap portions of flap 69, the remote portion of flap 63 will not unlock, and thus prevent an attempted off-center loading of a cassette.

Adjustment of the closing forces can be carried out individually, since symmetrically placed individual closing springs 68,69,70 (FIG. 6) can be provided, suitably secured in position. Holding brackets and the like have been omitted from the illustrations in FIGS. 5, 6 and 7 since they can be of any standard and suitable construction; likewise, the spring force of the springs 68,69,70 can be made adjustable, for example by securing one end of the spring to a hex-nut, and placing the hex nut in suitably matching wells, in individually adjusted position.

Various changes and modifications made be made and features described in connection with any one of the embodiments may be used with any of the other, within the scope of the inventive concept.

I claim:

1. Cassette tape transducer apparatus having
    a housing (H) formed with a cassette introduction opening of sufficient size to receive the largest (L) of a set (S, M, L) of at least two differently dimensioned cassettes (S, M, L);
    cover flap means (1, 3, 7; 61, 63, 67) closing of the cassette introduction opening and pivotable out of a closing position into an open position to permit introduction selectively of each cassette into the housing,
    said opening defining a plane symmetrically positioned about an axis bisecting said opening
    and comprising, in accordance with the invention,
    means for placing any of the cassettes (S, M, L) of the set in the opening only when presented in a position parallel to said plane and centered with respect to said axis, and while opening the cover flap means during an introductory movement of the respective cassette into the housing,
    wherein the cover flap means includes
    at least one cover flap which is subdivided into two flap portions (3a, 3b; 7a, 7b; 63a, 63b; 67a, 67b), each portion being positioned symmetrically with respect to said axes;
    connection means (2, 3c, 63c) coupling said portions together to permit only conjoint movement thereof; and
    individual locking means (4) locking the flap portions, individually, in closed position for inhibiting introduction of a cassette through said opening into said housing (H),
    said locking means having engagement elements (4b, 87), each associated with individual flap portions and engageable by a leading edge (6a) of the cassette being introduced into said housing for unlocking an associated one of the flap portions only so that, upon attempted introduction of a cassette in a position that is not parallel with said plane and not symmetrically positioned with respect to said axis, one of said locking means remains unengaged by the leading edge of the cassette and retains said respective cassette flap portion in closed position and prevents opening movement of the other flap portion coupled thereto by said connection means to thereby prevent symmetrical introduction of a cassette into the housing.

2. The apparatus of claim 1, wherein the set of cassettes includes at least three cassettes (S, M, L);
    said cover flap means are provided, positioned parallel to said plane and symmetrically with respect to said axis and defining a central flap having (1a, 1b) flap portion; symmetrically positioned about said axis bisecting said plane;
    a first lateral flap means having two first lateral flap portions (3a, 3b), each portion being located adjacent the central flap; and positioned symmetrically about said bisecting axis and
    a second lateral flap means having two second lateral flap portions (7a, 7b), each located adjacent a respective first lateral flap portion and positioned symmetrically about said bisecting axis.

3. The apparatus of claim 2, wherein the central flap (1, 61) corresponds in width to the width of the smallest (s) of said set of cassettes; and
    the two first lateral flap portions, being located parallel to said plane and, symmetrically, with respect to said axis, adjacent the central flap and, at their widest dimensions, corresponding approximately, with clearance, to the widest dimension of an intermediate sized cassette (m) of said set of cassettes.

4. The apparatus of claim 1, wherein said locking means are positioned symmetrically, with respect to said bisecting axis, adjacent the outer edges of the respective flap portions.

5. The apparatus of claim 3, wherein said locking means are positioned symmetrically, with respect to said bisecting axis, adjacent the outer edges of the respective flap portions.

6. The apparatus of claim 1, further comprising ridge means (10) located on the bottom wall (5,85) of the housing and adapted for engagement with the bottom wall of the cassette;
    and wherein said ridge means comprises means resiliently depressible within said bottom wall of the housing.

7. The apparatus of claim 6, wherein said resiliently depressible ridge means comprises an engagement surface (13) engageable with an edge (6a) of a cassette, for depressing the ridge means into the bottom wall of the housing.

8. The apparatus of claim 1, wherein said engagement elements (4a,87) of said locking means are resiliently maintained in a position engaging a respective flap portion, and are formed with an inclined surface (4b,88,89) adapted for engagement by the leading edge (6a) of a cassette, for depressing said elements out of engagement with the respective flap portion.

9. The apparatus of claim 8, further including a groove (26;90) formed in said elements and positioned to receive an edge of the respective flap portion for positively locking said flap portion in closed position across said introduction opening.

10. The apparatus of claim 1, wherein the respective locking means (4) are positioned adjacent outer regions, with of the respective flap portions.

* * * * *